United States Patent [19]

Close

[11] Patent Number: 4,892,891

[45] Date of Patent: Jan. 9, 1990

[54] NOVEL FOAM COMPOSITIONS

[75] Inventor: Donald S. Close, Stow, Ohio

[73] Assignee: Syn-Coat Enterprises, stow, Ohio

[21] Appl. No.: 279,408

[22] Filed: Dec. 2, 1988

[51] Int. Cl.$^4$ ............................................. C08G 18/14
[52] U.S. Cl. .................................... 521/69; 428/423.1; 521/100; 521/101; 521/110; 521/112; 521/114; 521/122
[58] Field of Search ................. 521/69, 100, 101, 110, 521/114, 112, 122; 428/423.1

[56] References Cited

U.S. PATENT DOCUMENTS

| | | | |
|---|---|---|---|
| 3,903,232 | 9/1975 | Wood et al. | 264/157 |
| 3,905,923 | 9/1975 | Klug | 260/25 AD |
| 4,127,124 | 11/1978 | Clagett et al. | 128/156 |

OTHER PUBLICATIONS

Hypol. Grace Co., Laboratory Procedures & Foam Formulations, date unknown, pp. 1–31.
PAPI, BASF Corporation, Technical Information, Sep. 1986, all pages.

*Primary Examiner*—Maurice J. Welsh
*Attorney, Agent, or Firm*—Oldham & Oldham

[57] ABSTRACT

Foam compositions with improved physical characteristics are from urethane prepolymers in the presence of various modifying agents. Blowing agents employed in the presence of surfactants make it possible to obtain either open or closed cell structures, and the degree of foam stiffness may be desirably controlled with polyols, as well as with polymeric polymethylene polyphenylisocyanates. Suitable modifying agents include asphalts, portland cement, epichlorohydrin, other epoxidized compounds, additional polymers, and various other materials.

21 Claims, No Drawings

NOVEL FOAM COMPOSITIONS

TECHNICAL FIELD

This invention relates to foam compositions that incorporate interactive modifiers preferably to enhance their physical properties. More particularly, this invention relates to modifier materials which effect the urethane prepolymers with which they are combined to produce novel foam compositions having unique characteristics. Specifically, this invention relates to foam urethane polymers which display useful properties as a result of the modifying materials combined therein, and which may in some cases be interactive therewith.

BACKGROUND OF THE INVENTION

Foamed polyurethane materials, for example, those formed from diisocyanates treated with polyethers or polyesters, and reacted with blowing agents to produce foams, have long been known. Such foams are commonly used in applications such as the fabrication of flexible articles including furniture, cushions, carpet underlays, and others. More rigid-type foams find use in products such as, for example, boat hulls, insulation, automobile components, and the like. While such foams find widespread application, they tend to be somewhat expensive, and the physical makeup of their structures imposes certain physical limitations which circumscribe the uses to which they can successfully be put. By suitably modifying such materials, however their altered, and the range of useful applications for which the materials are suited can be considerably expanded. Also, the lower polyalkylene ether polyols such as polyethylene ether glycol react with organic polyisocyanates and in the presence of blowing agents to yield water soluble or swellable foams.

DISCLOSURE OF THE INVENTION

In light of the preceding, therefore, it is a first aspect of this invention to provide foamed polyurethane structures having enhanced physical properties, especially with regard to water.

A second aspect of this invention is to provide foamed polyurethanes whose degree of rigidity can be desirably controlled.

Another aspect of this invention is to furnish a modified polyurethane foam structure by combining urethane prepolymers with materials believed to be interactive therewith, which yield products having unique and useful properties, in some instances non-water swellability and/or nailability.

A further aspect of this invention is to produce polyurethane foamed structures which are admirably suited for use in the fabrication of physical structures, including particularly, roofing structures.

An additional aspect of this invention is to prepare urethane foams that have the capability of being formed without the necessity of thermal curing or curing by treatment with ammonia.

Yet another aspect of this invention is to provide foamed polyurethane construction materials that are readily applied, and which display desirably modified physical characteristics.

The foregoing and still other aspects of the invention which are further amplified in the following detailed description of the invention, are provided by a product obtained by the process comprising reacting polymerizable components which include a polyurethane prepolymer in the presence of a blowing agent, preferably water, and at least one modifying agent, said modifying agent including fly ash, portland cement, asphalt, epichlorohydrin, a silicone, or mixtures of any of the preceding.

The foregoing and still other aspects of the invention are provided by the process comprising reacting polymerizable components which include a polyalkylene ether polyol, preferably a diol with an organic polyisocyanate in the presence of a blowing agent, and at least one modifying agent, said modifying agent including fly ash, portland cement, asphalt, epichlorohydrin, a silicone, or mixtures of at least two of the preceding.

The foregoing and still other aspects of the invention are provided by a lamination comprising a layer of the product of the penultimate paragraph having an adherent layer, preferably a planular one, on at least one side thereof formed from tar paper, modified bitumen, crosslinked polyethylane foam, roofing paper, metallic foil, plastic films, or a geotextile fabric or other well known planular members.

DETAILED DESCRIPTION OF THE INVENTION

Not unsurprisingly, foamed urethane materials display many desirable qualities which explains their widespread use; but unfortunately, however, they also show less than desirable properties, For example, while urethane foams provide good thermal insulating properties, with time, they succumb to deteriorating weathering as a result of ultraviolet degradation. With reference to roofing, asphalt compositions are highly hydrophobic, and are noted for the protection for which they provide in aqueous environments, a property which justifies there widespread use in applications such as roofing. Asphalt compositions are subject to undesirable softening at higher temperatures, however, as well as embrittlement at lower temperatures. While some adjustments can be made for these shortcomings, for instance, asphalt may be blended with block copolymers to provide elasticity, the results are usually less than satisfactory. In the case of the asphalt mixture referred to, blending requires the application of heat at the point of manufacture, and again at the point of application, necessitating an undesirable expenditure of expensive energy.

The invention herein described, overcomes such disadvantages through the use of "compound" foam materials in which the foam is modified by the incorporation of modifying agents. The latter impart properties to the former, compensating for its less desirable characteristics and enhancing its beneficial properties. The invention achieves this result, for example, through the use of urethane reactive system such as prepolymers to which modifying agents are added, and the mixture is then foamed through addition of a blowing agent to yield a foam exhibiting the properties desired. Without wishing to be bound by the theory, it is believed that the modifying agents taught are to some extent at least, interactive with the prepolymers, thus helping to make the enhancement achieved an integral part of the formulation.

The urethane reactive system, viz. the isocyanate terminated prepolymers contemplated by the invention are foamable hydrophilic prepolymers derive from toluene diisocyanate and usually a polyalkylene ether polyol where the alkylene radical has less than 3 carbon atoms and polyol can be from 2, 3, 4, 5, 6 or higher hydroxyls. The prepolymers of the invention are polyether polyisocyanates in which the polyether substituent may include a broad range of repeating units, and in which the polyisocynanate groups are located at the terminal ends of the main and side chains of the polymer. Prepolymers of the type forming one aspect of the invention are those sold under the trademark "HYPOL", a registered trademark of W. E. Grace & Co. of Lexington, Mass., or those of U.S. Pat. No. 4,127,124. As indicated, prepolymers of the type described are mixed with modifying agents, a blowing agent, and desirably other materials, initiating the reaction which results in a desired foam.

Various modifying agents have been successfully employed using the technique of the invention, including the bitumens such as petroleum asphalt, a black cementious material in which the predominating substituents are asphaltenes, resin and oils, which comprise a mixture a paraffinic and aromatic hydrocarbons, and heterocylic compounds containing sulfur, nitrogen, and oxygen atom. The asphalt or bituminous material may be incorporated with the prepolymer constituent of the reaction mixture by melting the material therein, or it can be incorporated in the form of an emulsion of the asphalt with water. Surprisingly, while asphalt has a ring and ball softening point of about 65-200° F., it develops a "soup-like" consistency well below 300° C. When it is incorporated in foams according to the method of the invention, the asphalt in the foam resists melting, suggesting interaction with the prepolymer.

Because of the hydrophobicity imparted by the asphalt to the foam product, the latter is particularly useful in waterproofing the outside of basement walls, and as roofing material even though the foam without the modifying agent may exhibit appreciable water solubility.

Even small amounts of asphalt incorporated with the prepolymers will achieve improved results; consequently, the amount of asphalt to urethane may be varied within a broad range. For example, the asphalt can constitute from about 5% to about 85%, preferably 15% to 60% on a weight basis, of the foamed product and about 40-70% gives satisfactory resistance to water swell.

Portland cement is another material admirably suited for use as a modifying agent in the process of the invention. The cement provides a stiffness to the foamed material, and may actually interact with the prepolymer itself. The prepolymer, on the other hand, allows the foamed material to absorb energy and to display a desirable degree of resilience, depending on the amount of cement actually used. The cement also operates to remove any excess water present in the foam. Our experience has shown that the foam can contain up to about 99% by weight of cement with beneficial results insofar as the properties of the foamed product are concerned. The preferred range is 20 to 80%.

Another modifying agent that has been successfully used is epichlorohydrin, especially a hydroxyl terminated epichlorohydrin which is thought to interact with the urethane prepolymer. An example of such a hydroxyl terminated epichlorohydrin is that marketed by the B. F. Goodrich Co. of Akron, Ohio and sold by it under the designation 10×1. The incorporation of the epichlorohydrin compounds not only imparts a degree of flame resistance to the polymer, due to the contained chlorine in the epichlorohydrin, but the resulting foam can be extremely soft, making it useful for packing delicate articles, for example, by preparing the foams in situ about the articles. Hence it is useful as a potting component depending upon the degree of softness desired, the amount of epichlorohydrin to prepolymer present may range from about 1% to 90%, and preferably 15 to 50% based on the total weight of the foam. Other epoxy compounds have also been incorporated in the prepolymers of the invention to produce extremely light foams having excellent physical integrity. Any of a variety of epoxies are satisfactory for the purpose, including such compounds as a liquid epoxy having a viscosity of about 12,000 centipoise at 25° C., and possessing an epoxy equivalent weight of from about 186 to 192, for example, the epoxy sold by Dow Chemical Co. of Midland, Michigan under the designation "Der 331". If desired, halogenated epoxy resins such as the epichlorohydrin previously referred to can also be employed.

One of the advantages of the foams of the invention is that the use of chlorofluorocarbons which have been implicated in the destruction of the ozone layer in the upper atmosphere need not be used. The cell structure is obtained by the interaction of a blowing agent, preferably water, which interacts with the prepolymers to produce carbon dioxide gas. If desired, the water added may be added as a separate component, or it can at least in part comprise water added in conjunction with another component of the system, for instance, the water in an asphalt emulsion, or that combined with another added material. The amount of water present will help determine the rate of the reaction; generally, however, from about 50% to 250% by weight of water, based on the weight of prepolymer employed is used, although amounts as high as 500% have been successfully incorporated for the purpose. If desired other blowing agents, for example, the aforementioned flurochlorohydrocarbons can also be employed, as can methylene chloride, or equivalent materials. In the cell formation process, the presence of surfactants is desirable since they provide more uniform cell structures and produce better process control. Cellular structure, density, strength, porosity, and the degree of hydrophobicity are all, to a degree, determined by the surfactant employed. Fatty ester or silicone surfactants, for example, can affect the hydrophobicity of the prepolymers, making them more hydrophobic. While many different surfactants can be used, nonionic, water dispersible surfactants are particularly useful because they can be readily added to water, and they have the ability to control cellular structure, regardless of the aqueous nature of the polymer formulations. Suitable nonionic surfactants, for example, include the PLURONIC series marketed under that trademark by BASF Wyandotte Corporation. Simple experimentation will identify the proper surfactant for the foam product desired. Any of the well known surfactants used to make urethane foams can be used.

Ordinarily the prepolymer and other components required for preparing the foams of the invention, as described in the foregoing, are mixed at room temperature, or if desired, at slightly above room temperature.

Using the modifiers described in the preceding, the invention is capable of making both flexible and rigid foams; however, it is sometimes desirable to increase the rigidity of the foam produced with a particular modifier, and this may be done through the use of an amine-containing polyol such as N, N, N', N,-Tetrkis (2-hydroxypropyl) ethylene-diamine. Such a material is sold, for example, by BASF of Parsippany, New Jersey under the trademark Quadrol. Other well known polyfunctional amines and polyols may also be used.

The rigidity of the foams may also be controlled by the use of polyphenylisocyanate that contains MDI, i.e., di-para-phenylene isocyanate. Such a product is sold by the Dow Chemical Co. under the trademark PAPI. If desired the polyisocyanate may be combined with a polyol in various ratios to provide varying rigidity and flexibility, the exact ratios depending upon the nature of the modifier, and being easily determined by simple experimentation. Usually the organic polyisocyanate is used in sufficient excess to yield prepolymers having 0.5–15% and preferably 1–10% by weight free NCO.

An additional advantage of the use of the amine-containing polyols is to be found in the fact that they permit cure of the epoxy modifying agents to be achieved without any need to subject the materials to ammonia in a special chamber provided for the purpose. Various polymers may also be incorporated with the foams of the invention as modifying agents to suitably alter the fundamental characteristics of the foam. Such materials include, for example, acrylic polymers and phenyl resins, as well as other polymers. Such materials may be conveniently added to the foam-forming components as dispersions in water.

Various methods may be employed for reacting the components to obtain the foams contemplated by the invention. For instance, the materials may simply be combined in a suitable container and mixed. The resulting "bun" may thereafter be cut into whatever shape is desired for the application contemplated. Alternatively, the components, including, for example, the prepolymer, the modifying agents, surfactants, blowing agents, etc., may be fed through a mixing nozzle in the form of a hand held "gun", and sprayed on the substrate where the foam is desired, e.g., a roof top, on pipes, to get a stucco effect or finish, etc.

One particularly useful embodiment of the invention comprises the lamination of the foams between layers of "skin", thereby forming "sandwich" structures which are particularly adapted to ease of handling. Structures of the type described can be made from materials including, but not limited to, paper materials, tar paper, modified bitumen, i.e. asphalt mixed with block copolymers, cross-linked polyethylene foam, asphalt-covered paper, metallic foils, geotextile cloths and scrims, as well as others.

While not intended to be limiting in nature, the following examples are illustrative of the invention.

EXAMPLE 1

An asphalt emulsion containing 50 percent by weight of asphalt, is combined with 1.5%, by weight, based on the weight of water present, of a surfactant such as 1.5% silicon oil, DC 190, and the mixture is combined with HYPOL 2002 urethane prepolymer manufactured by W. R. Grace & Co. and indicated to be the reaction product of a polyalkylene ether polyol with excess toluene diisocyanate usually 0.5–5% free NCO. Blowing begins as soon as the components are mixed. Three different compositions were prepared as follows, all figures shown in this and the following examples being in parts by weight:

|  | A | B | C |
|---|---|---|---|
| Asphalt/water (50/50) emulsion | 164 | 100 | 64 |
| Hypol 2002 urethane | 28 | 50 | 68 |

All three of the above formulas provide excellent closed cell structures, "A" being the stiffest foam, "C" being the most flexible, and "B" being intermediate between the two. If the foam had been generated with water only, it would have been highly swellable in water but the foam of experiments, A, B and C was essentially resistant to water swelling and nailable without cracking.

EXAMPLE 2

In a further experiment a similar procedure is followed using equal weights of asphalt and urethane, but in which portland cement is added to the mixture to provide the following compositions:

|  | D | E | F |
|---|---|---|---|
| Asphalt/water (50/50) emulsion | 100 | 100 | 100 |
| Hypol 2002 urethane | 50 | 50 | 50 |
| portland cement | 5 | 10 | 25 |

Of the above, both D and E are quite cellular, while F is almost a non-cellular solid. D, which has a specific gravity of less than one, is the softest of the materials, while F, having a specific gravity of over one, is the stiffest. As might be expected, E has a softness between the other two, and shows a specific gravity of approximately one. These Foams of runs D. E. and F could be carried out to foam between layers of heavy papers to give a 178 " laminate like commercial wallboard. The laminates of runs D. E and F could be readily nailed with wallboard nails and did not crumble like commercial gypsum wallboard. Also it showed resistance to water swelling and disintegration in the presence of water. Hence, Foam F laminates would be superior to gypsum wallboard for bathrooms in regard to water resistance and nailability.

EXAMPLE 3

In a further experiment, a urethane prepolymer is combined with an asphalt emulsion, as well as with an acrylic latex. 2%, by weight, of surfactant, based on the latex, is added. The experiment yields the following foams.

|  | G |
|---|---|
| Hypol 2002 urethane | 10 |
| Asphalt latex, 45% asphalt | 10 |
| Acrylic latex | 10 |

The foam produced shows excellent cell structure.

EXAMPLE 4

In still another experiment portland cement and sand are mixed with the prepolymer, together with 1.5%, of a surfactant, based on the weight of water present, to yield the following foams:

|  | I | J | K |
|---|---|---|---|
| Hypol 2002 urethane | 10 | 10 | 10 |

-continued

|              | I  | J  | K  |
|--------------|----|----|----|
| water        | 10 | 10 | 10 |
| portland cement | 5  | 10 | 3  |
| sand         | —  | —  | 7  |

These foams had excellent resistance to water and could be used to spray on wallboard to give a simulated stucco finish to a building.

EXAMPLE 5

In a further experiment epichlorohydrin is combined with a urethane prepolymer as follows:

|                     | L  | M  | N  |
|---------------------|----|----|----|
| Hypol 2002 urethane | 10 | 10 | 10 |
| Epichlorohydrin     | 10 | 10 | 10 |
| Water and Surfactant| 10 | 5  | 2  |

The "L" foam is fairly stiff; that of "M" is softer, while "N" is quite soft. It can be seen that the amount of water/surfactant used, in the case of the experiment 1.5% by weight, based on water present, of surfactant being used, determines the rigidity of the material, and such amount may be properly adjusted by experimentation. The extreme softness of the foam is unique to the use of an epichlorohydrin modifying agent. Also, these foams had improved burn resistance relative to foams made without the use of chlorine additives.

EXAMPLE 6

In another experiment, stiffness is controlled by the use of amine-containing polyol, i.e. Quadrol. In the experiment, the polyol/water blend containing the surfactant is combined with urethane to provide the desired foam, with results shown in the following table.

|                          | A   | B   | C   | D   | E   | F   | G   |
|--------------------------|-----|-----|-----|-----|-----|-----|-----|
| Hypol 2002 urethane      | 100 | 100 | 100 | 100 | 100 | 100 | 100 |
| 80% polyol/amine in water| 1   | 7   | 10  | —   | —   | —   | —   |
| 50% polyol/amine in water| —   | —   | —   | 2   | 7   | 8   | 10  |

Examination of the foamed products shows those included in A through C to be medium stiff, while those included in D through C are medium soft.

EXAMPLE 7

In a further experiment a combination of a polyol and a polyphenylisocyanate (PPI) is used to control the rigidity of the foams. The following foam preparations are produced:

|                          | A   | B   | C   |
|--------------------------|-----|-----|-----|
| Hypol 2002 urethane      | 100 | 100 | 100 |
| PPI                      | 100 | 100 | 100 |
| 80% polyol/amine in water| 60  | 40  | 50  |

The foams produced display a range of softness and varying density.

EXAMPLE 8

In yet another experiment, urethane-asphalt foams are prepared in which the amine-containing polyol is blended into an asphalt emulsion prior to blending with the other ingredients.

|                            | A   | B   | C   | D   | E   |
|----------------------------|-----|-----|-----|-----|-----|
| 50% asphalt/water in emulsion | 100 | 100 | 100 | 100 | 100 |
| PPI                        | 25  | 25  | 25  | 15  | 15  |
| Hypol 2000 urethane        | 25  | 25  | 25  | 35  | 35  |
| Polyol/amine               | 30  | 25  | 10  | 5   | —   |

While all the foams shown are relatively rigid, the foam of compound E which contains no poly/amine is softer than the others. Thus, the rigidity can be controlled to give laminates, with aluminum-foil, sheeting, paper or paper board of varying stiffness.

EXAMPLE 9

In a further experiment, urethane is blended with epichlorohydrin containing terminal hydroxyls to enable it to react into the system. Polyol/amine water is used as the curing system. The following foams are prepared.

|                          | A   | B   | C   | D   | E   | F   |
|--------------------------|-----|-----|-----|-----|-----|-----|
| Hypol 2000 urethane      | 100 | 100 | 100 | 100 | 100 | 100 |
| Epichlorohydrin          | 100 | 100 | 100 | 100 | 100 | 100 |
| 20% polyol/amine in water| 7   | 10  | 13  | —   | —   | —   |
| 80% polyol/amine in water| —   | —   | —   | 7   | 10  | 13  |

The softness of the foams varies from A, B, and C, relatively soft materials, to D, E, and F, which are relatively hard. None of the foams support flame when an applied match is removed, due to the chlorine in the epichlorohydrin molecule, a property suggesting antiflame uses. These would offer advantages in a wallboard type laminate.

EXAMPLE 10

In this example, urethane epichlorohydrin blends are cured with water containing a 2%, by weight, concentration of surfactant. The following foams are prepared:

|                          | A   | B   | C   |
|--------------------------|-----|-----|-----|
| Hypol 2000 urethane      | 100 | 100 | 100 |
| Epichlorohydrin          | 100 | 100 | 100 |
| Water containing surfactant | 14  | 20  | 33  |

Rigidity varies from the A product, which is quite soft, progressing through the C product, which is very soft.

EXAMPLE 11

In this experiment a series of rigid urethane-epoxy foams are prepared as follows:

|                     | A  | B  | C  |
|---------------------|----|----|----|
| PPI                 | 25 | 25 | 25 |
| Hypol 2000 urethane | 25 | 25 | 25 |
| Der 331 liquid epoxy| 50 | 50 | 50 |

|   | A | B | C |
|---|---|---|---|
| 80% polyol/amine in water and surfactant | 4 | 10 | 14 |

All the foams produced are quite light and appear to have excellent physical integrity and reduced water swellability.

EXAMPLE 12

A series of flexible urethane epoxy foams were prepared with the following recipes:

|   | A | B | C |
|---|---|---|---|
| Hypol 2000 urethane | 50 | 50 | 50 |
| Der 331 epoxy | 50 | 50 | 50 |
| 80% polyol/amine in water and surfactant | 4 | 7 | 10 |

The softness of the foams prepared increases from A through C; however, their density decreases. All the foams have excellent cell structure. If improved flame retardency is required, halogen epoxy resins can be substituted for those of the non-halogen type used in the experiment.

EXAMPLE 13

A phenolic resin dispersion, approximately 44% by weight solids, is used in the experiment, with 1.5%, by weight surfactant, based on the water present, being employed.

|   | A | B | C | D | E | F |
|---|---|---|---|---|---|---|
| Phenolic resin | 100 | 100 | 100 | 100 | 100 | 100 |
| Hypol 2000 urethane | 20 | 40 | 60 | 80 | 100 | 120 |

All compositions foam nicely, with B and C offering the lowest density and the most uniform cell formation. All the foams are flexible even after heat treatment at 300° C. for one hour, carried out for the purpose of the cross-linking the phenolic portion.

EXAMPLE 14

In an additional experiment, urethane phenolic foams are prepared as follows:

|   | A | B |
|---|---|---|
| Hypol 2000 | 50 | 50 |
| PPI | 50 | 50 |
| Phenolic resin | 80 | 120 |

Both foams are of a low density type, rigid, tough, and oven-curable, usually about 250–320° F. for about one hour.

EXAMPLE 15

A series of urethane-epoxy-phenolic foams is made from a mixture of an epoxy/phenolic resin with urethane to form the following foamed products:

|   | A | B | C | D |
|---|---|---|---|---|
| Hypol 2000 | 100 | 100 | 100 | 100 |
| Phenolic resin | 40 | 80 | 120 | 160 |

All foams thus prepared are flexible, and semi-flexible, even after an oven post-cure of one hour at 320° C. All the foamed products have relatively low densities, with samples B and C exhibiting the most uniform cell formation.

EXAMPLE 16

In an experiment similar to Example 15, the rigidity of the samples is modified by the inclusion of PPI in the following:

|   | A | B | C |
|---|---|---|---|
| Hypol 2000 | 50 | 50 | 50 |
| PPI | 50 | 50 | 50 |
| Phenolic resin | 40 | 80 | 120 |

All foams thus prepared have a low density and are relatively rigid. All are oven-curable, and sample C shows the most uniform cell formation.

EXAMPLE 17

In yet another series of examples, designed to evaluate a urethane dispersion as the curing/blowing agent, a urethane dispersion having 67% by weight solids, and containing 1.5% by weight of surfactant, is employed to make foamed samples as follows:

|   | A | B | C | D |
|---|---|---|---|---|
| Hypol 2000 | 100 | 100 | 100 | 100 |
| Urethane dispersion/surfactant | 200 | 300 | 400 | 600 |

Examination of the foam samples shows sample A to be of relatively low density, while the samples increase to a medium density in the progression from A to B. Samples A and B are extremely resilient, while C and D are relatively tough foams.

EXAMPLE 18

In an experiment similar to Example 17, additional samples are made with the following composition:

|   | A | B | C | D |
|---|---|---|---|---|
| Hypol 200 | 50 | 50 | 50 | 50 |
| PPI | 50 | 50 | 50 | 50 |
| Urethane dispersion/surfactant | 200 | 300 | 400 | 600 |

The resulting foams exhibit both low density and rigidity, with C showing the best cell development. All the foams are relatively tough materials.

EXAMPLE 19

A series of foam samples are made in which portland cement constitutes the modifying agent, with PPI being added to adjust rigidity. In the experiment four samples are made as follows:

|  | A | B | C | D |
|---|---|---|---|---|
| Hypol 200 urethane | 25 | 25 | 25 | 25 |
| PPI | 25 | 25 | 25 | 25 |
| portland cement | 50 | 50 | 50 | 50 |
| Water with 2% surfactant | 15 | 20 | 25 | 30 |

The foams produced are rigid and have a specific gravity of less than one. Samples C and D have twice the density of A and B.

EXAMPLE 20

Increased loading of portland cement in the foams of the invention are shown in the following examples:

|  | A | B |
|---|---|---|
| Hypol 2000 | 25 | 25 |
| PPI | 25 | 25 |
| portland cement | 100 | 100 |
| Water with 2% surfactant | 40 | 60 |

All the foams are quite dense, exhibiting a specific gravity of over one.

EXAMPLE 21

In a further series, a polyol/amine is added to the water for curing purposes with the following foams being prepared:

|  | A | B | C |
|---|---|---|---|
| Hypol 2000 urethane | 25 | 25 | 25 |
| PPI | 25 | 25 | 25 |
| portland cement | 50 | 50 | 25 |
| Silica powder | — | — | 25 |
| Polyol/amine, 50% in water | 5 | 10 | 5 |

The silicone employed is a flour-like material, added to test its ability as a thickener/extender. All the foam samples show very low density compared with samples cured with water alone. All are rigid and a little crumbly.

EXAMPLE 22

A commercial concrete mix which includes sand, as well as portland cement, is added to produce the following series of samples.

|  | A | B | C | D | E |
|---|---|---|---|---|---|
| Hypol 2000 | 25 | 25 | 25 | 25 | 25 |
| PPI | 25 | 25 | 25 | 25 | 25 |
| Commercial concrete mix | 50 | 50 | 100 | 100 | 90 |
| 20% polyol/amine in water | 10 | 20 | 10 | 2.5 | — |
| 50% polyol/amine in water | — | — | — | — | 50 |

The density of the samples thus prepared range from low, sample A, to lowest, sample E. All are very stiff, and E shows some flexibility, despite its 90% content of cement.

EXAMPLE 23

A similar group of samples employ water and surfactant as the curing system in the following:

|  | A | B | C | D |
|---|---|---|---|---|
| Hypol 2000 | 25 | 25 | 25 | 25 |
| PPI | 25 | 25 | 25 | 25 |
| Commercial concrete mix | 50 | 50 | 50 | 100 |
| Water and 2% surfactant | 10 | 30 | 50 | 50 |

Sample A breaks apart too easily to be of value; however, the rest of the samples have a desirably low density, and all show some flexibility. However, a paper laminate would have structural impact and nailability properties almost the same as gypsum wallboard.

EXAMPLE 24

Another series of foam samples is prepared with the following materials:

|  | A | B | C | D | E | F | G | H |
|---|---|---|---|---|---|---|---|---|
| Hypol 2000 urethane | 50 | 55 | 50 | 50 | 50 | 50 | 50 | 50 |
| Commercial concrete mix | 50 | 50 | 50 | 50 | 50 | 50 | 50 | 50 |
| Water plus 2% surfactant | 30 | 40 | 50 | 60 | 80 | 100 | 120 | 140 |

Densities extend from a relatively low value, example H, to a lowest value in sample A. Samples E through H show some shrinkage, with samples A through D having the best overall properties. All the sample foams obtained are flexible.

EXAMPLE 25

In another series the following foam samples are prepared.

|  | A | B | C | D |
|---|---|---|---|---|
| Hypol 2000 urethane | 30 | 30 | 30 | 30 |
| Commercial concrete mix | 60 | 60 | 60 | 80 |
| Water plus 2% surfactant | 30 | 60 | 90 | 30 |

All samples are flexible and exhibit low to medium density, D being the highest in the latter regard.

The preceding demonstrate that cement-urethane foams can be readily prepared employing a urethane prepolymer, together with a surfactant and blowing agent such as water, or in combination with components which influence the rigidity of the resulting foam, such as PPI. Other properties of the foam can be altered by varying the reactivity of the blowing or curing agent, thus water with surfactant can be used alone, or a polyol can be added to the water to increase reactivity.

The water swellability of the foam was determined by dropping a one inch cube in water for 10 minutes or more and measuring the change in dimensions.

This invention in some of its aspects provides unique lightweight structural foams that offer excellent nailability, integrity at relatively high temperatures for several hours and at very low to competitive prices. Thus, these foams can be fabricated as laminates, useful as wallboard or related structural or decorative paneling. For instance, a paper laminate having foam core could have a decoration coated plastic such as a film of polyethylene glycol phthalate or terephthalate or polypropylene with a design imprinted thereon adhered on the paper to give imitation hardwood or mahogany paneling. Or the laminate could be used as a substitute or replacement for gypsum wallboard. Alternately, the design imprinted foil or film could have foam formed thereonto adhere it to the foam.

Example 26 illustrates some of these foams which are particularly useful as a structural member or board or laminate.

EXAMPLE 26

LOW COST RIGID FOAMS FOR INSULATION AND FIRE PROTECTION

Calcium carbonate, gypsum, a plaster of paris, hydrated alumina, fly ash can be used as fillers to lower cost, increase rigidity and add fire retardancy to cellular products or to make unique porous structural materials.
Below are shown typical formulas using these fillers to produce foams of this invention.

|  | A | B | C | D | E | F | G | H | I |
|---|---|---|---|---|---|---|---|---|---|
| Hypol 2002 | 5 | 5 | 5 | 5 | 5 | 5 | 5 | 5 | 5 |
| PAPI 94 | 5 | 5 | 5 | 5 | 5 | 5 | 5 | 5 | 5 |
| Plaster of paris | 40 | — | — | — | — | — | — | — | — |
| Gypsum | — | — | — | — | 10 | 20 | 40 | 60 | — |
| Fly Ash | — | — | — | — | — | — | — | — | 40 |
| CACo3 | — | 40 | 50 | 20 | — | — | — | — | — |
| Hydrated alumina | — | — | — | — | — | — | — | — | — |
| H2O + 2% DC 190 surfactant | 20 | 20 | 20 | 10 | 5 | 20 | 20 | 20 | 10 |

|  | J | K | L | M | N | O | P | Q |
|---|---|---|---|---|---|---|---|---|
| Hypol | 5 | 5 | 5 | 5 | 5 | 5 | 5 | 5 |
| PAPI 94 |  |  |  |  |  |  |  |  |
| Gypsum | — | — | — | — | — | — | — | — |
| Fly ash | 50 | 90 | — | — | — | — | — | — |
| CACo3 | — | — | 20 | 40 | 60 | 90 | — | — |
| Hydrated alumina | — | — | — | — | — | — | 40 | 50 |
| H2O + 2% DC 190 | 20 | 50 | 10 | 20 | 30 | 30 | 20 | 20 |

DC 190 is a silicone available from the Dow Corning Co.

The foams made by the above recipes had specific gravities from 0.28 to 0.59 and the samples retained their integrity when exposed to flame from a propane torch rated at 3500° F. for a short time. Examination of the fired foam samples disclosed a surface char which appeared to protect the undersurface and thus aid in giving the fired foam integrity. The foam made using hydrated alumina as a filler in the foam was placed in a kiln at 2650° F. for ten hours and it retained its integrity. Also, foams were made with the above recipes except 80 parts of PAPI-94 and 20 parts of Hypol 2002 were used. The resulting foams were stiffer and had high densities and could be foamed between two planular members to yield a sheet-like laminate.

These foams could be formed as a laminate with a suitable sheet or film, where the sheet is a decorative design film or panel and the sheet or film is wallboard paper stock, polyester film, polyethylene, polypropylene or their copolymer films or related films.

These foams offer resistance to loss of integrity in fire, are nailable and exhibit insulation value. Thus laminates of these foams are useful as fire retardant barriers, insulation barriers and as barrier boards under house siding. An aluminum foil having a layer of foam of approximately 0.5 to 1 inch thick adhered thereto would have very desirable surface appearance and could be used in construction.

The recipes of example 26 could be used with suitable pressurized equipment to spray coat a substrate to give a pleasing stucco-like finish. Also cavities could be filled with these foam mixtures.

Also, these foam products offer advantages as building blocks for paving patios or playgrounds.

While in accordance with the patent statutes the preferred embodiment and best mode has been presented, the scope of the invention is not limited thereto, but rather is measured by the scope of the attached claims.

What is claimed is:

1. A product obtained by the process comprising reacting polymerizable components which include a polyurethane prepolymer in the presence of a blowing agent, and at least one modifying agent, said modifying agent including portland cement, asphalt, epichlorohydrin, a silicone, or mixtures of at least two of the preceding.

2. A product according to claim 1 wherein said polyurethane prepolymer is a polyisocyanate terminated polyether.

3. A product according to claim 1 wherein one of said polymerizable components is a polyol containing at least one amine group.

4. A product according to claim 1 wherein one of the polymerizable components is a polymethylene polyphenylisocyanate that contains di-para-phenylene phenylisocyanate.

5. A product according to claim 1 wherein during the reaction there is also present an acrylic-containing emulsion.

6. A product according to claim 1 wherein said blowing agent is water.

7. A process comprising reacting polymerizable components which include a polyurethane prepolymer in the presence of a blowing agent, and at least one modifying agent, said modifying agent including portland cement, asphalt, epichlorohydrin, a silicone, or mixtures of at least two of the preceding.

8. The process according to claim 7 wherein said polyurethane prepolymer is a polyisocyanate polyether.

9. The process of claim 7 wherein said blowing agent is water, and said modifying agent is portland cement.

10. The process of claim 7 wherein said blowing agent is water and said modifying agent is asphalt.

11. A non-water soluble polyurethane foam, said foam being the reaction product in the presence of a blowing agent of an organic polyisocyanate and water soluble polyalkylene ether polyol which normally gives a water swellable foam but said reaction product is modified by reacting said organic polyisocyanate and said polyalkylene polyol in the presence of a modifying agent to form a foam which is not water swellable.

12. The non-water swellable polyurethane foam of claim 11 wherein the polyalkylene ether polyol contains alkylene groups having 2 to 3 carbon atoms with the proviso that when some of the alkylene groups contain 3 carbon atoms the rest must contain 2 carbon atoms in the amount of at least 45%.

13. The foam of claim 12 wherein the organic polyisocyanate is selected from the class consisting of toluene diisocyanate and methane di(phenylene isocyanate).

14. A laminated foam product having at least one surface of a polyurethane foam adhered to essentially a planular member, said polyurethane foam being a reaction product of a water soluble polyalkylene ether polyol and an organic polyisocyanate in the presence of a blowing agent and a modifying agent to change the foam from a highly water swellable one to one that is non water swellable.

15. The laminated foam product of claim 14 wherein the planular member is a sheet or film of a plastic, metal or cellulose.

16. The non-water swellable polyurethane foam of claim 11 wherein the organic polyisocyanate is a diisocyanate and the polyol contains less than 10% by weight of a tri or high functional polyol.

17. The non-water swellable polyurethane foam of claim 11 wherein the modifying agent is bitumen.

18. A laminate composed of at least one planular member bonded to a polyurethane foam that has had its ability to swell in water, changed by the organic polyisocyanate reacting with a reactive hydrogen containing material by reacting in the presence of sufficient modifying agent to render the foam essentially non-water swellable in water at about 75° F. for 10 minutes.

19. The laminate of claim 18 wherein the foam does not exhibit water swellability after one hour in water.

20. The laminate of claim 18 wherein the polyurethane foam is the reaction product of a polyalkylene ether polyol whose alkylene group is at least 40% ethylene groups, an excess organic polyisocyanate and water.

21. The laminate of claim 20 wherein the modifying agent is selected from the class of fly ash, cement and bitumens.

* * * * *